United States Patent [19]

Deem

[11] 3,758,618

[45] Sept. 11, 1973

[54] PRODUCTION OF TETRAFLUOROETHYLENE OLIGOMERS

[75] Inventor: William Roy Deem, Runcorn, England

[73] Assignee: Imperial Chemical Industries Limited, London, England

[22] Filed: Feb. 27, 1973

[21] Appl. No.: 15,275

[30] Foreign Application Priority Data
Mar. 3, 1969 Great Britain............... 11,137/69

[52] U.S. Cl. .......................... 260/653.1, 252/429 R
[51] Int. Cl........................... C07c 17/26, C08f 3/22
[58] Field of Search ............................. 260/653.1 T

[56] References Cited
UNITED STATES PATENTS

| | | | |
|---|---|---|---|
| 2,918,501 | 12/1959 | Brehm et al. .................... | 260/653.3 |
| 3,083,238 | 3/1963 | Hauptschein et al. ........ | 260/653.1 T |
| 3,403,191 | 9/1968 | Graham .......................... | 260/653.1 |

FOREIGN PATENTS OR APPLICATIONS 1,082,127  9/1967  Great Britain ............... 260/653.1 R

*Primary Examiner*—Daniel D. Horwitz
*Attorney*—Cushman, Darby and Cushman

[57] ABSTRACT

Tetrafluoroethylene is advantageously oligomerized by interacting fluoride ions with tetrafluoroethylene in the presence of quaternary ammonium ions from the chloride, bromide or iodide salts. The preferred source of fluoride ions is potassium fluoride.

10 Claims, No Drawings

PRODUCTION OF TETRAFLUOROETHYLENE OLIGOMERS

This invention relates to the production of oligomers of tetrafluoroethylene.

In our Great Britian No. 1,082,127 a method is disclosed of making oligomers of tetrafluoroethylene by contacting the monomer under anhydrous conditions with one or more fluorides of potassium, rubidium, caesium or of a quaternary ammonium ion. Caesium fluoride is expensive and a process using it can be economic only if it is possible to recover or regenerate it readily from the reaction system; we have not found this to be possible. The tetraalkylammonium fluorides are tedious and time-consuming to prepare and are so hygroscopic that stringent precautions are necessary to keep them dry enough for use in the oligomerisation reaction.

We have now found that oligomers of tetrafluoroethylene may be made more efficiently and in a more controllable manner by using fluoride ions derived from potassium fluoride in an inert reaction medium and in the presence of quaternary ammonium ions derived from a quaternary ammonium chloride, bromide or iodide.

Thus according to the present invention there is provided a process for making oligomers of tetrafluoroethylene by interacting tetrafluoroethylene under anhydrous conditions at an elevated temperature with fluoride ions derived from potassium fluoride in an inert reaction medium in the presence of quaternary ammonium ions derived from a quaternary ammonium chloride, bromide or iodide.

The term potassium fluoride includes also potassium acid fluoride KF.HF.

The quaternary ammonium radical can be tetraalkylammonium, for example tetramethylammonium, tetraethylammonium and triethylmethylammonium; or alkenylalkylammonium, for example allyltrimethylammonium and allyltriethylammonium; or arylalkylammonium, for example benzyltrialkylammonium such as benzyltrimethylammonium.

The inert reaction medium is that of a polar aprotic solvent and examples of inert, liquid reaction media are dimethylformamide, N-methylpyrrolidone, dimethylacetamide and dimethylethers of ethylene glycol and of diethylene glycol, of which dimethylformamide is particularly suitable.

The oligomerisation reaction is in one manner conveniently carried out by adding dry quaternary ammonium halide and dry powdered potassium fluoride and a small amount of a substance, for example α-pinene, that can inhibit free-radical polymerisation of tetrafluoroethylene to the reaction medium contained in an autoclave fitted with a stirrer. The resulting slurry is stirred at room temperature and tetrafluoroethylene is introduced into the autoclave up to a moderate pressure, for example 100–400 lb/sq. inch gauge and the temperature raised to about 80°C. The pressure falls as reaction occurs and further tetrafluoroethylene is introduced to re-pressurise the system. This procedure is repeated over a period of several hours, for example 2 to 15, whilst the temperature is maintained within a range of about 50°C to 120°C. When the oligomerisation has continued for a sufficient time the autoclave is cooled and the liquid layer of oligomers is separated from the reaction medium and any solid residues, and washed with a little fresh reaction medium and then dried over, for example, anhydrous sodium sulphate. The mixture of oligomers is then fractionated to give individual oligomers of which the pentamer usually accounts for about one half of the total.

In another manner of carrying out the reaction the potassium fluoride and quaternary ammonium halide are first allowed to react together in methanol to give a solution of the quaternary ammonium fluoride in methanol and a precipitate of the potassium halide. The latter is separated and the methanolic solution distilled under reduced pressure until about 75 percent of the methanol has been removed. A dry polar, aprotic solvent, for example dimethylformamide, is then added in sufficient quantity to dissolve the quaternary ammonium fluoride (for example the solubility of $(CH_3)_4NF$ in dimethylformamide is about 60 g/litre) and the remaining methanol removed by distillation. Before the solution of quaternary ammonium fluoride is transferred to the autoclave for reaction with tetrafluoroethylene it is filtered to remove any residual potassium halide. The filtered solutions can be stored in sealed polythene bottles for several weeks if desired.

Quaternary ammonium fluoride produced as hereinbefore described in the form of a homogeneous solution has an advantage, in the reaction with tetrafluoroethylene, over a heterogeneous system comprising quaternary ammonium fluoride in solution and solid potassium halide in suspension. For under some conditions particles of solid metal halide might act as breeding points for an unwanted rapid exothermic homopolymerisation of tetrafluoroethylene. This possibility also exists in heterogeneous systems comprising Group I metal fluorides and polar, aprotic solvents in contact with tetrafluoroethylene.

There is considerable advantage in the ease of handling the reactants, conducting the oligomerisation reaction and the yield of oligomers obtained from the use of fluoride ions derived by the process of this invention compared with prior art processes.

The tetrafluoroethylene oligomers produced from the reactions herein described are observed to have spectroscopic and chemical properties corresponding to the formulae and structures hereinafter listed.

Tetramer: $C_8F_{16}$:

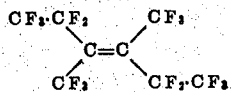

cis and trans perfluoro-3,4-dimethylhex-3-ene.

Pentamer: $C_{10}F_{20}$:

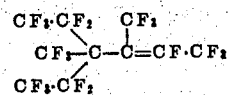           (Main isomer)

perfluoro-4-ethyl-3,4-dimethylhex-cis-2-ene.

Hexamer: $C_{12}F_{24}$ (Two isomers):

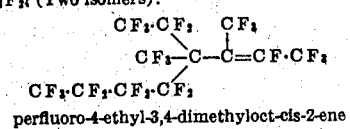

perfluoro-4-ethyl-3,4-dimethyloct-cis-2-ene and

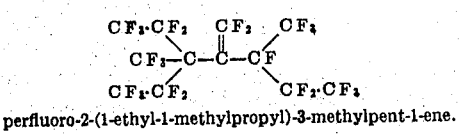

perfluoro-2-(1-ethyl-1-methylpropyl)-3-methylpent-1-ene.

The perfluoroolefines produced by the process of this invention are thermally stable liquids which may be used as heat-transfer fluids or hydraulic fluids particularly in high temperature applications. Other uses of perfluoroolefines include fluid dielectrics, refrigerants, transformer fluids, and turbine impellents. A wide range of chemical derivatives of the oligomers may be made and a multitude of uses generally as additives to other materials can be envisaged ranging over nearly the whole of industry. The preparation of primary derivatives for example oxybenzene, carboxyl, sulphonyl and amino derivatives have been described in Great Britian Pat. Nos. 1,130,822; 1,148,486; 1,143,599; 1,155,607; 1,151,601 and Great Britian Pat. applications Nos. 3361/67; 22182/67 and 11084/67. From such derivatives, by employing conventional chemical reactions, many other functional groups may be attached to the perfluoro group derived from the oligomers and the types of compound which may be produced include monomers and polymers, surface active agents, dyestuffs, greases and waxes, lacquers and other surface coatings, or pharmaceuticals. All the types of compounds produced may have properties substantially different from those of conventional compounds by virtue of the properties imparted by the presence of the perfluoro group in the molecule. The oligomers which have a perfluoro olefinic structure as exemplified hereinbefore may be fluorinated for example by methods described in "Advances in Fluorine Chemistry" by M. Stacey and J.C. Tatlow Vol. I. Butterworths 1960 or by passing the oligomer vapours over a bed of cobalt trifluoride heated to 150°–250°C in a nickel tube. Fluorinated oligomers are branched perfluoroalkanes having inert stable properties over a wide temperature range which find application for example as solvents (mainly for other fluorine-containing compounds), coolants, oils and fluid dielectrics.

Many other liquid compounds derived from oligomers of tetrafluoroethylene, for example phosphate and sulphonate esters of acid derivatives, which include the compounds

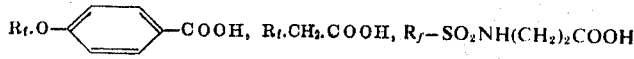

(where $R_f$ is the oligomer residue) are useful in applications where inert stable liquids are required. Similarly, amine, amide, alcohol or ether derivatives of oligomers, if liquid at room temperature, will have similar uses. The esters particularly have been used as working fluids in dielectric, hydraulic, refrigerant applications or when inert fluids are required for heat transfer, diluent, lubricant or impellent purposes. Many compounds of this type, preferably those of higher molecular weight and often those derived from the higher oligomers of tetrafluoroethylene, may be used as extreme pressure or high temperature lubricants for example in the fabrication of thermoplastics.

In textile technology compositions used as antistatic spinning aids may incorporate phosphate esters of oligomer-based acids because of their stability.

Phosphate esters, particularly of acids based upon oligomers, may find application as plasticisers where high temperature stability and/or chemical inertness are important. Many other liquid compounds containing fluorocarbon groups derived from oligomers may be added to natural and synthetic solids in order to modify their properties, and at the surface they may serve for example as antiblocking agents in plastic films or provide non-soil, or antifrictional properties for leathercloth, leather or wood. They may act as softening agents in pastes or clays, extenders in snythetic rubbers, and plasticising or lubricating agents in high temperature films.

Monomers and polymers containing oligomer-derived fluorocarbon groups may be made by the addition of polymerisable groups to the oligomer residue or to a derivative thereof. For example polymerisable ester derivatives of any acids containing tetrafluoroethylene oligomer residues may be made from alcohols, phenols and glycols which include in their structure a polymerisable group for example the groups vinyl, vinylidene or epoxy. Alternatively hydroxy derivatives of oligomers may be combined with unsaturated acids for example acrylic, methacrylic or epoxy acids such as glycidic. Alternatively other polymerisable groups including for example the groups

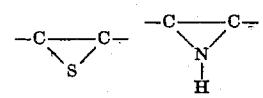

may be attached by other reactions. The polymers made from these monomers are useful as coatings for metals or for plastic and other organic surfaces for example leathercloth, leathers, wall coverings, packaging board and paper and for textile materials and fabrics, including those from synthetic and natural fibres and blends of these.

The monomers containing oligomer residues may be co-polymerised with other monomers, syrups or resins to improve plastic moulding compositions or to make paints, lacquers and varnishes with an exceptionally smooth finish. They have many applications to cosmetic materials including hair lacquers, nail varnishes, shampoos and hand creams, or to medical uses including films to exclude water in dentistry, in the treatment of abrasions for protection against skin irritants and plastic replacement parts for human or animal bodies.

Polymers and copolymers incorporating fluorocarbon chains derived from oligomers and intermediates, as described in Great Britian Pat. applications Nos. 3361/67, 22187/67 and Great Britian Pat. No. 1130822 often possess a useful combination of hydrophobic, oleophobic and non-adhesive properties. Therefore films of this type are used as barriers to retain both oil and water or either separately for example in bearings for all forms of machinery particularly in applications where contamination of oil or water with the product is undesirable.

The polymer film may be applied to metal surfaces for example as a non-corrosive, easily cleaned coating on many containers, including baking utensils and as a lubricant coating for razor blades. The textile applications include the impregnation of heavy duty cloth or fabric for example that used in conveyor belts, sails, tarpaulin-type covers, the proofing of clothing against oil and water and the treatment of curtains and other decorative drapes against soiling or staining. There are many specialist applications for example in the treatment of fabrics, leather, wood, Kapok, paper, fur, felt, asbestos, bricks, concrete, metals and alloys, ceramics, plastics and rubber foams, plaster, powders in which oligomer-derived compounds especially polymeric compounds provide unique properties. The oligomer residue, which imparts new properties to a surface may be applied in different ways; the active fluorine-containing group may be incorporated in a compound which has surface active properties or which thoroughly wets or adheres to a surface. Thus detergents and surfactants may be made from the oligomers for example by chemical reactions described in our U.S. Pat. Nos. 1,130,822; 1,155,607 or from oligomer-based carboxylic acids by reactions described in U.S. Pat. Nos. 1,002,324 or 1,067,063. Carboxylic, sulphonic, phosphoric acids with oligomer residues attached are useful as fuel additives to improve the performance of engines and accessories such as carburetters, or as heavy oil additives for instance to improve the flow properties of oil in recovery from oil wells and in other large oil installations. To assist dyeing operations the carboxylic acid derivatives may be advantageously added to the dyeing and auxiliary solutions, for example the compounds $C_{10}F_{19}OC_6H_4 \cdot COOH$ and $C_6F_{13}CH_2COOH$ both obtained from tetrafluoroethylene pentamer have been used successfully. Many ionic compounds containing branched perfluoroalkyl and alkenyl groups show particularly useful detergent properties even in non-aqueous systems, for example they are useful in many cleaning operations for example in the industrial cleaning of plastics and metals or in medical cleaning where ultra-high standards of grease removal or surface cleanliness are required. The novel structure of the perfluorocarbon chain imparts properties useful in applications involving aqueous and non-aqueous emulsions for example where cleaning/polishing or cleaning/surface treatment are desirable in one operation such as cosmetic cleansing preparations, shampoos, furniture cleaners and the like.

Surface active compounds having attached to the oligomer residue a wide variety of different hydrophilic groups of cationic, anionic or non-ionic character have found ready application to impart desirable surface properties to solid materials before and after fabrication and both in storage and under conditions of continual wear.

In metal industries tetrafluoroethylene oligomer derived surfactants may be used to inhibit corrosion of steels, aluminium and other metals or to promote resistance to tarnishing of metal surfaces. The surfactants may be used with mineral acids, alkalis or organic compounds such as ethyl mercaptan or thiourea, for the above applications: also for applications such as metal-etching processes, bright dips and pickling of stainless steel and in electrochemical milling processes for many metals, for example magnesium, copper, brass, steel, aluminium, zinc and tin similar additives are used.

The fluorocarbon chain in the surfactants hereinbefore described often prevents the adhesion of scale, sediment and other dirt to surfaces, and use may be made of this in boilers and other chemical plant. Alternatively surfactant may be added to water as a water treatment chemical where it has many of the functions listed above, and for special cleaning purposes which include for example the cleaning of glass bottles, ornamental stone or even concrete. Fluorochemical surface active compounds have many uses in the electroplating industry and one of the oligomer-derived compounds which may be used is the compound $C_{10}F_{19}OC_6H_4SO_3Na$. When 0.26 percent by weight of $C_{10}F_{19}OC_6H_4SO_3Na$ was added to a plating solution containing 500 g/l $CrO_3$ and 5 g/l $H_2SO_4$ the surface tension was lowered to 24 dynes/cm which allowed a foam blanket to be produced over the surface. The surface tension and foam remained unchanged for 120 hours at 100°F showing that the oligomer derivative was resistant to the oxidising action of the chromic acid.

It is a feature of many serface active agents based upon tetrafluoroethylene oligomers that smaller concentrations may be used for the same surface active effects than of conventional hydrocarbon surfactants. Thus they have found application in their power to wet efficiently the particle surfaces of many fillers, for example glass and carbon fibres, inorganic oxides and salts; thus improved dispersions are produced with better compatibility of the solid filler with the parent material which is important in the casting or moulding of many resins and plastics. Fluorochemical surfactants may also be added to very low concentration to polymer syrups to aid the evolution of air bubbles. They find application to impart self-levelling quality and very uniform spread to polishes, waxes and particularly emulsions designed to impart a shine as they dry. All these surface coatings for floors, shoes, furniture and cars are improved often because better spreading and shine can be achieved by much smaller concentrations of oligomer-based fluorocarbon surface active agents than with other surfactants. Thus the adhesion of new polish to the surface is not impaired and the resistance of the coating to wear or washing is improved compared with polishes using other surface active agents.

A variety of uses of tetrafluoroethylene oligomer-based surfactants or similar oligomer derivatives depend upon leaving a stable layer of fluorocarbon material which resists contamination and has oleophobic properties on a surface which may be a glass, a plastic, a metal or a powder, a textile or human skin. Thus they find many applications in cosmetic preparations for example skin creams, shampoos, hair lacquers; in medical preparations including antiseptic creams; in photographic emulsions which resist marking or produce the required refractive index; and in the treatment of paper or other cellulosic surfaces to reduce the effects of soiling or staining. They may be used in applications such as release coatings in cookery and the like operations where the high degree of temperature stability is an advantage and as an extension of this use in many food products including dried and frozen foods where very low concentrations of a powerful surfactant are often required. The tendency of a surface treated with an oligomer-based surfactant to be non-adhesive and self-lubricating is used in powder technology or in the treatment of mineral ores. Powders may be treated with these compounds to improve flow characteristics and prevent caking in the latter stages of manufacture or minerals may be treated in the earlier stages, some-times with foams made from fluoro-chemical surfactants, to aid their separation, cleaning, grading or transportation. These surface active agents are very effective dispersing agents; they are used as emulsifying agents in polymerisation processes, especially those involving fluorine containing monomers. They may be used for more effectively dispersing fillers, antioxidants or pigments including for example carbon black, graphite, titanium dioxide, chalk, aluminium powder and the like in many liquid and viscous materials for example in thermoplastics, paints, syrups, oils or printing inks. The good chemical and thermal stability of surface active oligomer derivatives makes them suitable for the production of emulsions or dispersions at higher temperatures than are possible with conventional surface active agents or in chemical environments which attack hydrocarbon groups, for example strongly oxidising conditions or extremes of acidity or alkalinity.

A range of co-ordination compounds containing tetrafluoroethylene oligomer residues may be prepared by means of reaction between salts of metals (which include for example chromium, aluminium, vanadium, titanium, tin, lead, iron, nickel and cobalt) with oligomer derivatives, especially the carboxylic acid derivatives; but derivatives which include other coordinating groups for example other acids, alcohols or amines may be used to prepare co-ordination compounds. For example the complexes prepared by reacting chromyl chloride with various oligomer-derived carboxylic acids according to methods described in Great Britian Pat. Nos. 712,784; 1,002,324 have been shown to impart remarkable water and oil repellency to porous materials.

Examples of carboxylic acids made from tetrafluoroethylene pentamer from which metal complexes may be derived include the acids $C_{10}F_{19}OC_6H_4COOH$, $C_{10}F_{19}NH(CH_2)_3COOH$ and $(C_2F_5)_2(CF_3) \cdot CCH_2 \cdot COOH$.

The chromium complexes of these acids or analogous complexes of other metals, for example aluminium, adhere tenaciously to many substances and may be used for treating paper and textiles where colour is not important, for example in tents or army uniforms. They may also be used to impart a hydrophobic surface to wood, ceramics or leather.

By a suitable choice of the metal used to make the complex a very strong bond may be made with corrosive or oxidisable metal surfaces to protect them from chemical attack or with polished metal surfaces to prevent deterioration. Such specially prepared surfaces have utility in specialised applications for example in the instrument or electronic industries and in the manufacture of automobile parts and accessories.

Tetrafluoroethylene oligomer derivatives may be sufficiently oleophobic that an oil barrier can be generated on metal, or plastic surfaces by either metal complexes and/or high molecular weight derivatives of the oligomers.

The oligomer derivatives and other materials present in particular compositions for the many applications hereinbefore described may be conveniently dispersed in aerosol form. An organic or aqueous solution or dispersion to which a propellant is added may be sealed in an aerosol container and stored ready for use as required.

The invention is illustrated but in no way limited by the following Examples:

EXAMPLE 1

Dry tetramethylammonium chloride (10.9 g), dry potassium fluoride (5.8 g), dry dimethylformamide (100 ml) and α-pinene (0.10 g) were placed in a dry 300 ml stainless steel autoclave fitted with a stirrer. The autoclave was swept out with nitrogen and tetrafluoroethylene introduced up to a pressure of 200 lb/sq. inch gauge. The reaction mixture was then stirred and the temperature raised to 80°C resulting in a pressure-drop of 200 lb/sq. inch. The reaction system was re-pressurised several times with tetrafluoroethylene and the temperature maintained at 80°C–96°C until after 10 hours the total pressure-drop amounted to 1855 lb/sq. inch. The autoclave was then cooled and the oligomer layer separated, washed with a little dimethylformamide and dried over anhydrous sodium sulphate. The oligomers (112 g) were separated by gas-liquid chromatography into tetramer, $C_8F_{16}$ (13.7 g), pentamer $C_{10}F_{20}$, (63.7 g), hexamer, $C_{12}F_{24}$ (22.8 g) and heptamer $C_{14}F_{28}$ and higher oligomers (11.8 g).

EXAMPLES 2–11

The results obtained from the experiments described in Examples 2–10 are given in the Table 1. The experiments were carried out in the general manner described in Example 1 in that the fluoride source was potassium fluoride and a quaternary ammonium halide and the reaction medium was dimethylformamide, but in some a 25-litre autoclave was used with correspondingly larger quantities of reactants. Example 11 described a comparison experiment in which potassium fluoride alone was the fluoride source. In Table 1 DMF represents dimethylformamide.

EXAMPLE 12

Dry tetramethylammonium chloride (293 g, 4.5 moles) in dry methanol (1,000 ml) was added to a stirred solution of anhydrous potassium fluoride (261 g, 4.5 moles) in dry methanol (3,600 ml) at ambient temperature under an atmosphere of dry nitrogen. After about one minute a white crystalline precipitate of potassium chloride was formed. The crystalline precipitate was filtered to give a clear methanolic solution of tetramethylammonium fluoride. Dry dimethylformamide (7,500 ml) was added to the methanolic solution of tetramethylammonium fluoride contained in a 20 litre distillation apparatus. The methanol was distilled off from the reaction mixture by heating between 60°–70°C and under a reduced pressure of 10–15 mm Hg. When all the methanol

TABLE 1

| | Wt. of quaternary ammonium halide | Wt. of KF, g. | Volume of DMF, mls. | Total pressure drop, lb./sq. inch | Reaction time, hours | Reaction temp., °C. | Oligomers formed, g. | Rate of oligomer formation, g./hr |
|---|---|---|---|---|---|---|---|---|
| Example: | | | | | | | | |
| 2 | $(CH_3)_4NCl$—17.6 | 9.5 | 150 | 2,280 | 6.5 | 99–105 | 60.5 | 9.3 |
| 3 | $(CH_3)_4NCl$—420 | 228 | 7,000 | 405 | 3.7 | 85 | 3,503 | 950 |
| 4 | $(CH_3)_4NCl$—493 | 261 | 7,000 | 3,545 | 8.7 | 65–75 | 14,400 | 1,890 |
| 5 | $(C_2H_5)_4NBr$—14 | 4 | 100 | 2,575 | 14.0 | 20–72 | 70 | 5.0 |

TABLE 1—Continued

| Wt. of quaternary ammonium halide | Wt. of KF, g. | Volume of DMF, mls. | Total pressure drop, lb./sq. inch | Reaction time, hours | Reaction temp., °C. | Oligomers formed, g. | Rate of oligomer formation g./hr |
|---|---|---|---|---|---|---|---|
| Example: | | | | | | | |
| 6 ...... $(C_2H_5)_4NBr$—350 | 200 | 7,000 | 645 | 5.3 | 120 | 6,250 | 1,172 |
| 7 ...... $(C_3H_5)(C_2H_5)_3NBr$—22.2 | 5.8 | 100 | 425 | 8.5 | 95-102 | 56.1 | 6.6 |
| 8 ...... $(C_3H_5)(CH_3)_3NBr$—17.9 | 5.8 | 100 | 2,380 | 10.2 | 90 | 61.4 | 5.9 |
| 9 ...... $C_6H_5CH_2(CH_3)_3NCl$—18.5 | 5.8 | 100 | 2,000 | 9.5 | 55-68 | 63.4 | 6.7 |
| 10 ...... $C_6H_5CH_2(C_2H_5)_3NCl$—22.8 | 5.8 | 100 | 350 | 8.0 | 89-100 | 16.8 | 2.1 |
| 11 ...... NIL | 5.0 | 150 | 800 | 6.0 | 125 | 140 | 23 |

(4,600 ml) and some of the dimethylformamide had been removed, the solution of tetramethylammonium fluoride in dimethylformamide was allowed to cool to ambient temperature under reduced pressure, and then the pressure increased to atmospheric by admitting dry nitrogen. The cooled solution of tetramethylammonium fluoride in dimethylformamide was filtered again in order to remove any solid precipitate that may have settled out during cooling.

The solution of tetramethylammonium fluoride in dry dimethylformamide (7,000 ml) and α-pinene was placed in a dry 25 litre stainless steel autoclave fitted with a stirrer. The autoclave was sealed, swept out with dry nitrogen and tetrafluoroethylene introduced to a pressure of 200 lb/sq. inch gauge. The reaction mixture was then stirred and the temperature raised slowly to a maximum of 80°C until there was a pressure drop of 200 lb/sq. inch. The reaction system was repressurised several times with tetrafluoroethylene over the range 160–225 lb/sq. inch gauge and the temperature maintained at 55°–87°C for 5½ hours. The autoclave was then cooled to ambient temperature, the excess pressure released and the tetrafluoroethylene oligomers blown out of the vessel with nitrogen. The yield of oligomers was 6555 g.

EXAMPLES 13–23

The process was carried out using either tetramethylammonium chloride or triethylmethylammonium chloride with potassium fluoride in the same manner as described in Example 12 but under the particular conditions shown in Table 2.

The results are presented in Table 2.

fitted with a stirrer. The autoclave was swept with nitrogen and tetrafluoroethylene introduced to a pressure of 200 lbs. per square inch. The reaction mixture was then stirred and the temperature raised to 84°C for 6.5 hours during which time the total pressure drop was 100 lbs. per square inch. The autoclave was then cooled and the oligomer layer separated, washed with water and dried over sodium sulphate. The oligomers (19.6 gms.) were separated by gas-liquid chromatography into tetramer, $C_8F_{16}$ (18 percent), pentamer $C_{10}F_{20}$ (76 percent) and hexamer $C_{12}F_{24}$ (6 percent).

What we claim is:

1. A process for making oligomers of tetrafluoroethylene by interacting tetrafluoro-ethylene under anhydrous conditions at 50° to 120°C in the presence of a catalyst prepared by the mixing of potassium fluoride or potassium acid fluoride and a quatenary ammonium chloride, bromide or iodide in a polar aprotic solvent to form a slurry, the catalyst being subsequently used without separation of the components of said slurry, and wherein the quaternary ammonium ion is selected from the group consisting of the tetraalkyl ammonium, alkenylalkyl ammonium and benzyltrialkyl ammonium ions.

2. A process as claimed in claim 1 wherein the quaternary ammonium ion is a tetraalkylammonium ion.

3. A process as claimed in claim 2 wherein the quaternary ammonium ion is the tetramethylammonium or the tetraethylammonium ion.

4. A process as claimed in claim 2 wherein the quaternary ammonium ion is methyl(triethyl)ammonium.

5. A process as claimed in claim 1 wherein the qua-

TABLE 2

| Quaternary ammonium compound | | Volume of methanol added to $NR_4Cl$ (ml.) | Weight of potassium fluoride (KF) (gm.) | Volume of methanol added to KF (ml.) | Volume of dimethylformamide (ml.) | Oligomerisation conditions | | | Oligomer formed (gm.) | Production rate (gm./hr.) |
|---|---|---|---|---|---|---|---|---|---|---|
| $(NR_4Cl)$ | (gms.) | | | | | Pressure range (p.s.i.g.) | Temp. range (°C.) | Reaction time (hrs.) | | |
| Example: | | | | | | | | | | |
| 13 ... $(CH_3)_4NCl$ | 493 | 1,000 | 261 | 3,600 | 8,000 | 100-240 | 52-80 | 11.25 | 16,005 | 1,430 |
| 14 ... $(CH_3)_4NCl$ | 330 | 650 | 241 | 4,500 | 8,000 | 140-250 | 60-78 | 6.37 | 11,698 | 1,835 |
| 15 ... $(CH_3)_4NCl$ | 203 | 600 | 204 | 2,800 | 8,000 | 200-240 | 52-86 | 4.75 | 9,300 | 1,960 |
| 16 ... $(CH_3)_4NCl$ | 203 | 600 | 204 | 2,800 | 8,000 | 160-280 | 61-74 | 6.93 | 9,225 | 1,335 |
| 17 ... $(C_2H_5)_3CH_3\overset{+}{N}\overset{-}{Cl}$ | 845 | 3,000 | 350 | 3,000 | 8,000 | 100-240 | 45-82 | 11.00 | 12,612 | 1,145 |
| 18 ... $(C_2H_5)_3CH_3\overset{+}{N}\overset{-}{Cl}$ | 845 | 1,000 | 350 | 3,000 | 7,500 | 110-240 | 58-86 | 10.0 | 13,761 | 1,376 |
| 19 ... $(C_2H_5)_3CH_3\overset{+}{N}\overset{-}{Cl}$ | 845 | 1,500 | 350 | 3,500 | 7,500 | 75-270 | 48-67 | 5.88 | 7,445 | 1,265 |
| 20 ... $(C_2H_5)_3CH_3\overset{+}{N}\overset{-}{Cl}$ | 845 | 1,500 | 350 | 3,500 | 7,500 | 140-250 | 50-84 | 10.5 | 14,830 | 1,410 |
| 21 ... $)C_2H_5)_3CH_3\overset{+}{N}\overset{-}{Cl}$ | 845 | 1,500 | 350 | 3,500 | 8,000 | 100-250 | 59-78 | 7.5 | 14,034 | 1,870 |
| 22 ... $)C_2H_5)_3CH_3\overset{+}{N}\overset{-}{Cl}$ | 845 | 1,500 | 350 | 3,500 | 8,000 | 110-240 | 58-79 | 5.53 | 12,168 | 2,200 |
| 23 ... $(C_2H_5)_3CH_3\overset{+}{N}\overset{-}{Cl}$ | 845 | 1,500 | 350 | 3,500 | 8,000 | 100-230 | 56-75 | 5.82 | 18,402 | 3,170 |

EXAMPLE 24

Dry tetramethyl ammonium chloride (20 gms.), dry potassium bifluoride (acid fluoride) (15 gms.), dry dimethyl formamide (300 mls.) and α pinene (0.10 gms.) were placed in a dry 1000 mls. stainless steel autoclave ternary ammonium ion is the benzyl(trimethyl)ammonium or benzyl(triethyl)ammonium ion.

6. A process as claimed in claim 1, wherein the quaternary ammonium ion is an alkenyl(trialkyl)ammonium ion.

7. A process as claimed in claim 6 wherein the quaternary ammonium ion is the allyl(trimethyl)ammonium or the allyl(triethyl) ammonium ion.

8. A process as claimed in claim 1 wherein the polar aprotic solvent is dimethylformamide, N-methyl pyrrolidone, dimethylacetamide, dimethylether of ethylene glycol or dimethylether of diethylene glycol.

9. A process as claimed in claim 1 wherein the tetrafluoroethylene is reacted under a pressure of 100–400 lb/sq. inch.

10. A process as claimed in claim 1 wherein the oligomer of tetrafluoroethylene produced has the formula $(C_2F_4)_n$ wherein $n$ is 4, 5 or 6.

* * * * *